United States Patent [19]

Sano et al.

[11] Patent Number: 4,505,491

[45] Date of Patent: Mar. 19, 1985

[54] STEERING SYSTEM FOR VEHICLES

[75] Inventors: Shoichi Sano, Tokyo; Yoshimi Furukawa, Saitama, both of Japan

[73] Assignee: Honda Giken Kogyo Kabushiki Kaisha, Tokyo, Japan

[21] Appl. No.: 478,699

[22] Filed: Mar. 25, 1983

[30] Foreign Application Priority Data

Mar. 25, 1982 [JP] Japan .................. 57-47743
Mar. 30, 1982 [JP] Japan .................. 57-52161

[51] Int. Cl.³ .............................................. B62D 7/14
[52] U.S. Cl. ........................................ 280/91; 180/236
[58] Field of Search ............... 180/140, 234, 236, 240; 280/771, 91, 95 R, 95 A, 96, 98, 99, 103; 74/39, 40, 42, 43, 50, 89, 89.16, 89.2, 496, 498

[56] References Cited

U.S. PATENT DOCUMENTS

| 2,948,546 | 8/1960 | Fabere et al. | 280/95 R |
| 3,605,932 | 9/1971 | Wilfert et al. | 280/96 |
| 3,838,607 | 10/1974 | Hemens | 74/496 |
| 4,295,657 | 10/1981 | Sano et al. | 280/91 |

FOREIGN PATENT DOCUMENTS 2076759 12/1981 United Kingdom .................. 280/91

Primary Examiner—Joseph F. Peters, Jr.
Assistant Examiner—Ross Weaver
Attorney, Agent, or Firm—Irving M. Weiner; Pamela S. Burt

[57] ABSTRACT

A steering system for a vehicle including steerable front and rear wheels. The steering system comprises a steering wheel; a front wheel steering mechanism for steering the front wheels in accordance with a rotating movement of the steering wheel; a movement transmission mechanism for converting the rotating movement of the steering wheel into, and rearwardly transmitting, a push-pull movement and outputting same in the form of a transverse movement; and a rear wheel steering mechanism for steering the rear wheels in accordance with the transverse movement. The steering system is particularly advantageous with respect to design flexibility and manufacture.

12 Claims, 6 Drawing Figures

STEERING SYSTEM FOR VEHICLES

BACKGROUND OF THE INVENTION

1. Field of the Invention

The present invention relates generally to a steering system for vehicles. More particularly, the invention relates to a steering system for vehicles of a type in which the rear wheels as well as the front wheels are arranged to be steerable by the steering operation of a steering wheel.

2. Description of Relevant Art

There has previously been proposed a steering system for a vehicle in which the rear wheels as well as the front wheels are steerable by the steering operation of a steering wheel. Such steering system is arranged such that for relatively small steering angles of the steering wheel, which are generally experienced while vehicles are travelling at relatively high speeds, the rear wheels are steered in the same direction as the front wheels, and for relatively large steering angles during travel at relatively low speeds the rear wheels are steered in the opposite direction relative to the front wheels or the steered angle thereof is returned at least to a substantially zero degree. The driving characteristics of the vehicle during relatively high speed travel are thereby improved and, moreover, the turning operation of the steering wheel during relatively low speed travel is rendered at least as effective as that of conventional vehicles in which only the front wheels are steerable.

The present invention provides a steering system affording the aforesaid front and rear wheel steering by means of a novel arrangement.

SUMMARY OF THE INVENTION

The present invention provides a steering system for a vehicle including steerable front and rear wheels, comprising a steering wheel, a front wheel steering mechanism for steering the front wheels in accordance with a rotating movement of the steering wheel, a movement transmission mechanism for converting the rotating movement of the steering wheel into, and for rearwardly transmitting, a push-pull movement and outputting same in the form of a transverse movement, and a rear wheel steering mechanism for steering the rear wheels in accordance with the transverse movement.

The movement transmission mechanism may comprise a first converting mechanism for converting the rotating movement of the steering wheel into the push-pull movement, a rearward transmission mechanism for rearwardly transmitting the push-pull movement and a second converting mechanism for converting the push-pull movement into the transverse movement.

The rearward transmission mechanism may comprise an at least partial flexible member stretched in the form of a loop, or a rod member arranged longitudinally.

It is an object of the present invention to provide, in the art of vehicles having front and rear wheels which are both steerable, a steering system comprising a novel arrangement which provides various advantages in design and manufacture.

Another object of the invention is to provide a steering system for a vehicle including front and rear wheels which are both steerable, in which the degree of restriction on the layout is minimized so that the system is applicable to various vehicle models.

Still another object of the invention is to provide a steering system for a vehicle including steerable front and rear wheels, which is capable of favorably supporting the rear wheel steering load, and which has a decreased number of components, a reduced cost, etc.

The above and further features, objects and advantages of the invention will become apparent from the following detailed description of preferred embodiments when read in conjunction with the accompanying drawings.

DETAILED DESCRIPTION OF PREFERRED EMBODIMENTS

Figure 1:
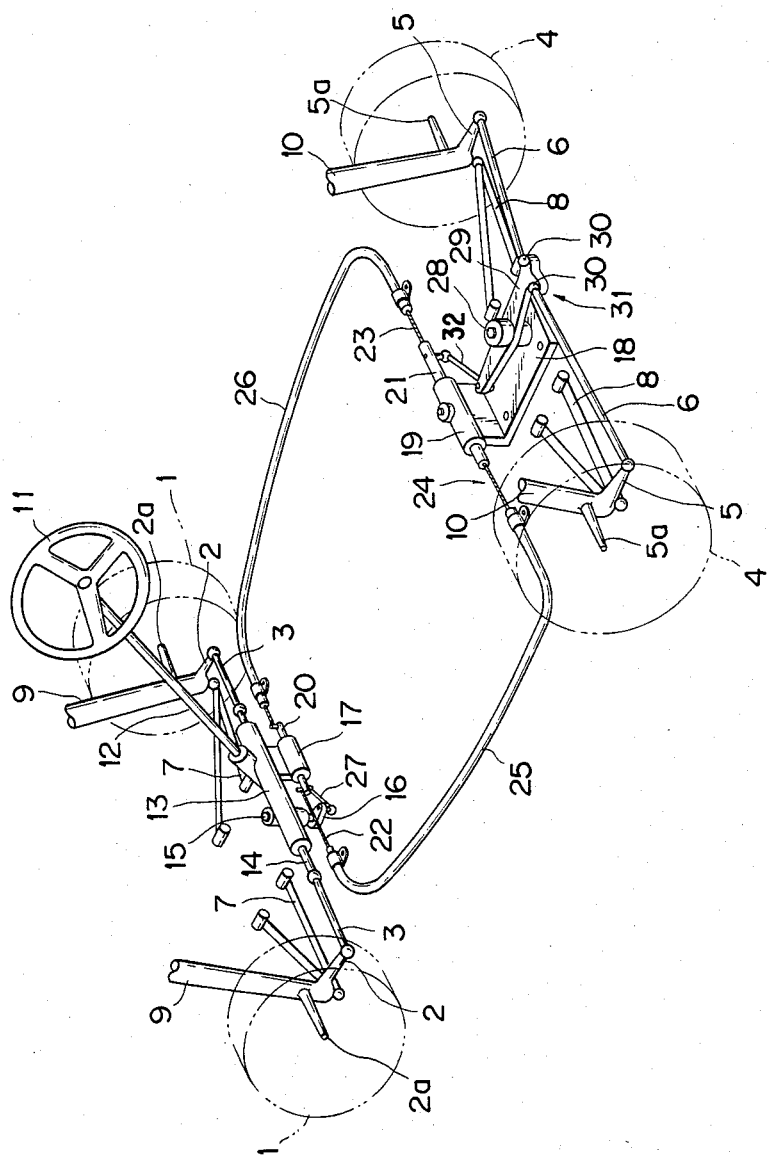
FIG. 1 is a perspective view of an essential part of a vehicle having a steering system according to a first embodiment of the invention.

With reference to FIG. 1, there is shown left and right front wheels 1, 1 which are supported by respective axle portions 2a, 2a of a pair of transversely rotatable knuckle arms 2, 2. Connected to knuckle arms 2, 2 of the front wheels 1, 1 are the outer ends of a pair of left and right front wheel steering tie rods 3, 3, respectively, so that as the tie rods 3, 3 move transversely of the vehicle the front knuckle arms 2, 2 are rotated, causing the front wheels 1, 1 to be steered. Likewise, left and right rear wheels 4, 4 are supported by respective axle portions 5a, 5a of a pair of transversely rotatable knuckle arms 5, 5. Connected to knuckle arms 5, 5 of the rear wheels 4, 4 are the outer ends of a pair of left and right rear wheel steering tie rods 6, 6, so that as the tie rods 6, 6 move transversely of the vehicle the rear knuckle arms 5, 5 are rotated, thus causing the rear wheels 4, 4 to be steered.

The front and rear knuckle arms 2, 2 and 5, 5 are suspended from a vehicular body (not shown) with front and rear suspensions which may comprise front and rear lower arms 7, 7 and 8, 8 and dampers 9, 9 and 10, 10, respectively.

A steering wheel 11 adapted for rotating operation by a driver is fixed to the upper end of a steering shaft 12, which has the lower part thereof extended into a gear box 13. The gear box 13 is provided therein with a converting mechanism (not shown) of, for example, a rack and pinion type for converting a rotating motion of the steering shaft 12 due to the steering of the steering wheel 11 into a rectilinear motion of a rod 14 in the transverse direction of the vehicle. The rod 14 is connected at either end thereof with respective inner ends of the front tie rods 3, 3, so that the rectilinear motion of the rod 14 forces the tie rods 3, 3 to move in the aforesaid manner so as to cause the front wheels 1, 1 to be steered.

With the above-described arrangement comprising the gear box 13, the rod 13 and the tie rods 3, 3 there is constituted a front wheel steering mechanism of a well known type. In this respect, the gear box 13 may comprise a power cylinder which provides an assist power to thereby reduce the necessary torque for the steering operation of the steering wheel 11.

The gear box 13 is assembled with a vertical rotatable shaft 15 integrally provided at the lower end thereof with a lever 16 which is rotatable in a horizontal plane. The rotatable shaft 15 is adapted to rotate as the rod 14 performs the rectilinear motion relative to the gear box 13, which function is achieved by arranging the rod 14 as a rack and the rotatable shaft 15 as a pinion shaft in engagement with the rack. With this arrangement, the rotatable shaft 15 as well as the lever 16 may be interlocked with the steering wheel 11, for thereby causing same to rotate. To achieve the interlocking of the lever 16 with the steering wheel 11 so as to cause lever 16 to rotate, there may be provided an arrangement in which a steering shaft incorporates, for example, a worm gear and a bevel gear, and a gear box has a lever as an output member, or in which a steering shaft is directly fitted with a lever.

The gear box 13 installed in the front part of the vehicle is integrally formed with a guide portion 17, while a bracket 18 fixed in the rear part of the vehicle is also integrally formed with a guide portion 19. The guide portions 17, 19 have slidable rods 20, 21 transversely slidably provided therethrough, respectively. The rods 20, 21 are connected to each other at the left ends thereof through a cable 22, while the right ends thereof are connected to each other through another cable 23, whereby an endless loop-like running band 24 comprising the rods 20, 21 and the cable 22, 23 is provided for the vehicular body. The running band 24 is permitted to run by the aid of a guiding effect of the guide portions 17, 19 and a pair of guide pipes 25, 26 fitted on the cables 22, 23 and joined to the vehicular body so as to be held thereby, respectively. The running band 24 has the principal portions thereof composed of the flexible cables 22, 23 so that, when stretching the loop-like running band 24 along the vehicular body, it is allowed to lay by making the cables 22, 23 curve or detour into a desired plan form while avoiding various equipment on the vehicular body such as an exhaust pipe. The running band 24 thus has a preferable freedom of layout afforded by merely forming the guide pipes 25, 26 in accordance with the desired plan form of the cables 22, 23.

The lever 16 extending rearwardly from the lower end of the rotatable shaft 15 is connected at the distal end thereof with one end of a connection link 27, the other end of which is connected to the front slidable rod 20 forming part of the running band 24, with the result that the steering wheel 11 and the running band 24 are connected to each other through the lever 16, interlocked with the steering wheel 11 and thereby caused to rotate, and the connection link 27 connected at either end with the lever 16 and the running band 24. Accordingly, when the steering wheel 11 is operated to be steered, the running band 24 will be caused to run with the rotation of the lever 16 about the rotatable shaft 15 as the center thereof.

The bracket 18 has a support shaft 28 extending upwardly therefrom, the support shaft 28 supporting the lengthwise central part of a link 29 having the lengthwise direction thereof extending in the longitudinal direction of the vehicle, the link 29 comprising a turnable link which turns in a horizontal plane about the support shaft 28. The turnable link 29 is connected at the front end thereof through a connection link 32 to the rear slidable rod 21 forming part of the running band 24 and at the rear end thereof through joints 30, 30 to the respective inner ends of the rear tie rods 6, 6. The turnable link 29 cooperates with the rear tie rods 6, 6 which constitute a rear wheel steering mechanism 31 connected through the connection link 32 with the loop-like running band 24.

When the running band 24 is caused to run by rotation of the steering wheel 11, the link 29 will turn, so that the tie rods 6, 6 move transversely of the vehicle, thus causing the rear wheels 4, 4 to be steered. Because the running of the running band 24 is caused concurrently with the transverse movement of the front tie rods 3, 3, the steering of the rear wheels 4, 4 will be effected together with that of the front wheels 1, 1.

When the steering wheel 11 is turned to the right, pulling forces will be exerted on the right cable 23 to thereby turn the turnable link 29 and, on the contrary, when steering wheel 11 is turned to the left, pulling forces will be exerted on the left cable 22 to turn the turnable link 29 in the opposite direction. In either case, the rear wheels 4, 4 can be steered by the pulling force of the running band 24, and the running band 24 is advantageously allowed to have the diameter or width thereof made smaller, thus possibly contributing to the reduction of vehicle weight when compared with an arrangement in which a running band which is not looped but instead comprises an ended linear member is applied to exert pushing forces in the opposite direction relative to the pulling force to thereby turn the turnable link 29 and to cause the rear wheels 4, 4 to be steered.

The running band 24 will run in either direction until the lever 16 rotates to a certain rotation angle $\alpha 1$, and, when the rotation angle $\alpha 1$ is exceeded, the band 24 will start running in the opposite direction. This angle $\alpha 1$ corresponds to the rotation angle of the lever 16 when the lever 16 falls in straight line relation with the connection link 27. When the rotation angle reaches another certain rotation angle $\alpha 2$ larger than $\alpha 1$, the running band 24 will return to the original point thereof at which it was disposed when the rotation angle was zero. As the rotation angle increases further, the running band 24 will have the position thereof exceeding the original point. Respective concrete values of the angles $\alpha 1$, $\alpha 2$ depend on various factors such as the relationship among positions of the lever 16, the connection link 27 and the running band 24.

Figure 2:
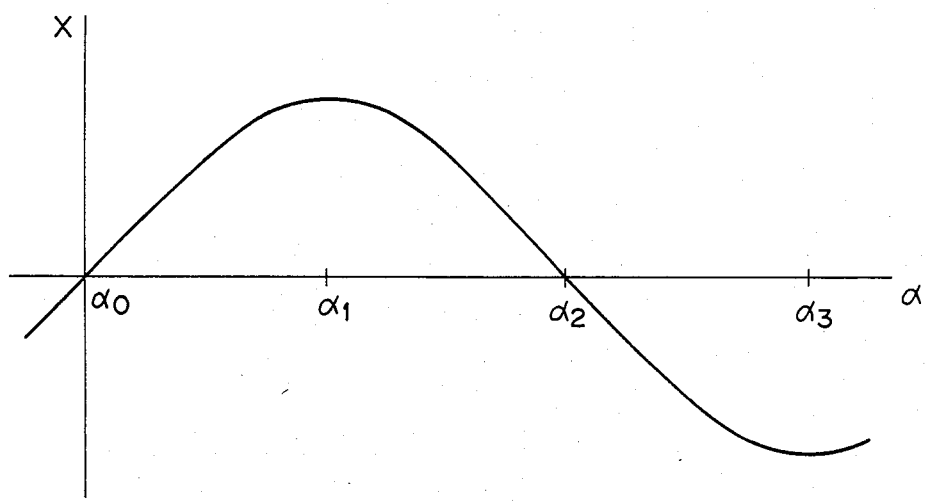
FIG. 2 is a graph showing the displacement of a tie rod for steering rear wheels for various rotating angles of a lever of the steering system of FIG. 1.

Referring now to FIG. 2, the axis of abscissa defines an angle $\alpha$ of rotation of the lever 16, while that of ordinate represents a distance X of a movement of the rear tie rods 6, 6 caused by the turning of the turnable link 29 due to the running of the running band 24. The distance X increases as the rotation angle $\alpha$ varies from $\alpha 0$ as the zero degree point thereof to $\alpha 1$ and, when $\alpha 1$ is reached, X becomes a positive value. After $\alpha$ has exceeded $\alpha 1$, X is turned to decrease while still keeping positive values and, at $\alpha 2$, X returns to zero. After $\alpha$ is exceeded, X further decreases, thus assuming negative values and, when $\alpha$ reaches $\alpha 3$, X becomes a minimum value.

Although the graph of FIG. 2 shows a fundamental tendency of X relative to $\alpha$, it permits the comprehension of rear wheel steering mode versus front wheel steering mode.

The absolute value of X is substantially proportional to the degree of steered angle of the rear wheels 7, 7, while the positive and negative signs of X represent respective steered directions of the rear wheels 4, 4 relative to a neutral position as a reference position which the rear wheels 4, 4 are arranged to take during straight travel of the vehicle. When the steering wheel 11 is rotated in either direction, as X has the positive or negative sign thereof reversed between before and behind α1, the rear wheels 4, 4 will be steered in the same direction as the front wheels 1, 1 for relatively small steering angles of the steering wheel 11 and in the opposite direction thereto for relatively large steering angles thereof. The ratio of the rotation angle of the lever 16 to that of the steering wheel 11 may be properly determined with speed changing mechanisms installed in the gear box 13 and other places, so that for relatively large steering angles of the steering wheel 11 the rotation angle of the lever 16 can be kept at or in the vicinity of α2, thereby enabling the steered angle of the rear wheels 4, 4 to return to or near zero for relatively large steering angles, while still causing the rear wheels 4, 4 to be steered in the same direction as the front wheels 1, 1 for relatively small steering angles. Moreover, the lengths of the lever 16 and the turnable link 29 may be properly determined so that the ratio of the steered angle of the rear wheels 4, 4 to that of the front wheels 1, 1 can be preset at a desirable value.

Figure 3:
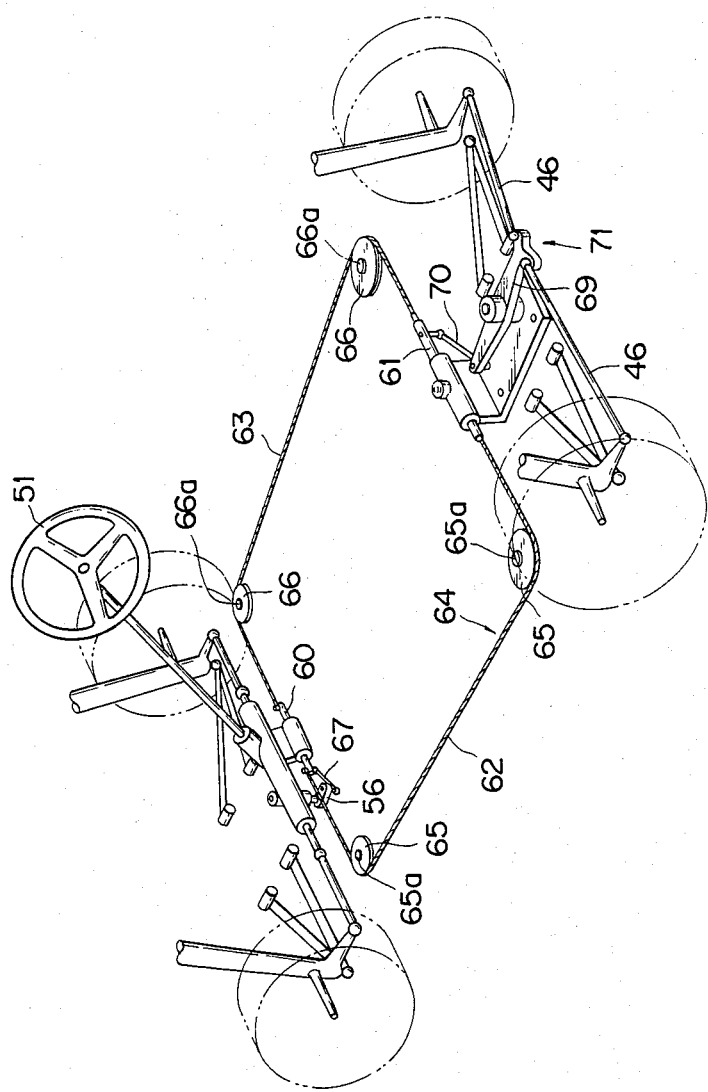
FIG. 3 is a perspective view of an essential part of a vehicle having a steering system according to a second embodiment of the invention.

Referring now to FIG. 3, there is shown a loop-like running band 64 comprising front and rear slidable rods 60, 61 and left and right cables 62, 63. The front rod 60 is connected through a connection link 67 with rotatable lever 56 interlocked with a steering wheel 51, while the rear rod 61 is connected through a connection link 70 to a rear wheel steering mechanism 71 comprising rear tie rods 46, 46 and a turnable link 69. As opposed to the first embodiment, the cables 62, 63 have no guide pipe fitted thereon. In this second embodiment, the cables 62, 63 are guided with a plurality of guide pulleys 65, 65, 66, 66 which are arranged in accordance with plan curvatures of the cables 62, 63 and fixed to a vehicular body (not shown) so as to be rotatable by means of respective shafts 65a, 65a; 66a, 66a. The running band 64 is thus advantageously ensured of having a smooth running without appreciable friction resistance which, in the case where a guide pipe is used, may be found between a cable and the guide pipe. The cables 62, 63 may alternatively comprise a pair of chains, while sprockets may be used in place of the pulleys 65, 66.

Figure 4:
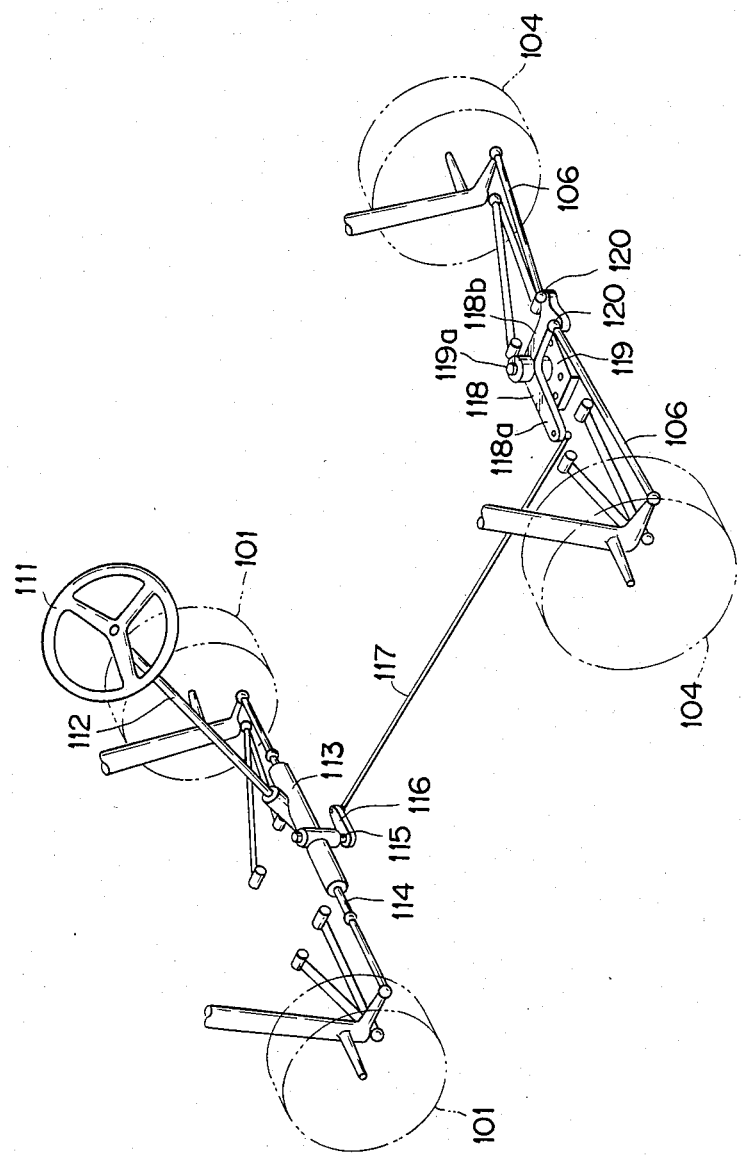
FIG. 4 is a perspective view of an essential part of a vehicle having a steering system according to a third embodiment of the invention.

Referring now to FIG. 4, there is shown a gear box 113 assembled with a rotatable shaft 115 having the axis thereof arranged substantially vertically, the rotatable shaft 115 being connected at the lower end thereof with a lever 116 having a horizontal rotating plane. The gear box 113 is arranged such that, when a steering wheel 111 is rotated, the lever 116 will be caused to rotate while being interlocked with the steering wheel 111 through a steering shaft 112, a rod 114 and the rotatable shaft 115. The direction in which the lever 116 rotates depends on the steering direction of the steering wheel 111. The lever 116 is fastened at the distal end thereof with the front end of a long solid rod 117 defining a working member capable of advancing and retreating in the longitudinal direction of the vehicle, the rod 117 extending from the front part of the vehicle to the rear part thereof and being fastened at the rear end thereof to the end of a first extended portion 118a of a link 118. The link 188 is shaped substantially in the form of a letter L, in the plan view, comprising the first extended portion 118a and a second extended portion 118b and arranged to be turnable in a horizontal plane about a support shaft 119a of a bracket 119 constituting a part of a vehicular body (not shown). The second extended portion 118b extending rearwardly is connected at the distal end thereof to respective inner ends of a pair of rear tie rods 106, 106 through joints 120, 120, thereby interconnecting the rod 117 with the tie rods 106, 106.

When rotated, the lever 116 will force the rod 117 as a working member to move in the longitudinal direction of the vehicle, thereby causing the link 118 to turn about the support shaft 119a and thus having rear wheels 104, 104 steered with the rear tie rods 106, 106.

The rod 117 is connected through the lever 116 and the rotatable shaft 115 to the rod 114 constituting a front wheel steering mechanism and to a rear wheel steering mechanism comprising the link 118 and the rear tie rods 106, 106, so that the steering of the rear wheels 104, 104 by the rear wheel steering mechanism is effected together with that of front wheels 101, 101 by the front wheel steering mechanism. When causing the rear wheels 104, 104 to be steered, the rod 117 will have loads acting thereon in the axial direction thereof, thus working as an advance-retreat member which advances and retreats in accordance with the steering direction of the steering wheel 111. Therefore, the rod 117 for transmitting the rear wheel steering force is permitted to be applied as a member on which the rear wheel steering force is acting only in the axial direction. The rod 117 may be suspended from the vehicular body by means of a slide bearing to thereby effect support of the rod 117.

The mechanism for causing the rod 117 to move in the longitudinal direction of the vehicle in accordance with the rotating operation of the steering wheel 111 is not limited to the embodiment shown in FIG. 4, and may be of any suitable arrangement in which, for example, the steering shaft 112 is directly provided with a gear box such as one incorporating a bevel gear and a worm gear for interlocking the steering wheel 111 with, and thereby rotating, a lever connected to a rod as a working or advance-retreat member.

In this third embodiment, there is provided a converting mechanism comprising the link 118 having substantially an L-shape in plan for converting the movement of the rod 117 in the longitudinal direction of the vehicle into a movement of the rear tie rods 106, 106 in the transverse direction of the vehicle to thereby cause the rear wheels 104, 104 to be steered. However, the converting mechanism may be of any suitable type.

Figure 5:
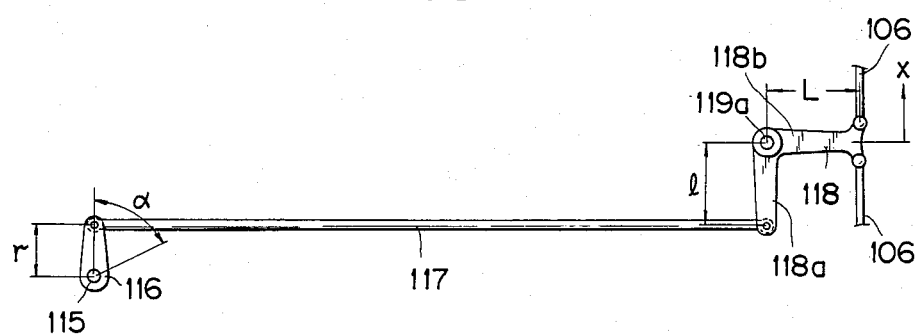
FIG. 5 is a plan view of an essential portion of the steering system of FIG. 4.

Referring now to FIG. 5 showing a plan view of the lever 116, the rod 117 and the link 118, designated by reference character r is the radius of rotation of the lever 116, l is the length of the first extended portion 118a of the link 118 and L is the length of the second extended portion 118b thereof. When the steering wheel 111 is located at a neutral position of rotation, or in other words while the vehicle is travelling in a straight manner, the lever 116 and the first extended portion 118a of the link 118 will have extended positions thereof opposite to each other in the transverse direction of the vehicle, as shown in FIG. 5. The rod 117 has a length reaching from the front part of the vehicle to the rear part thereof. When considering the length l to be sufficiently longer than L, it will be understood that, when the lever 116 is rotated by an angle $\alpha°$, the rear tie rods 106, 106 will move transversely of the vehicle by a displacement X as follows:

$$X = r(L/l)\sin\alpha°.$$

Figure 6:
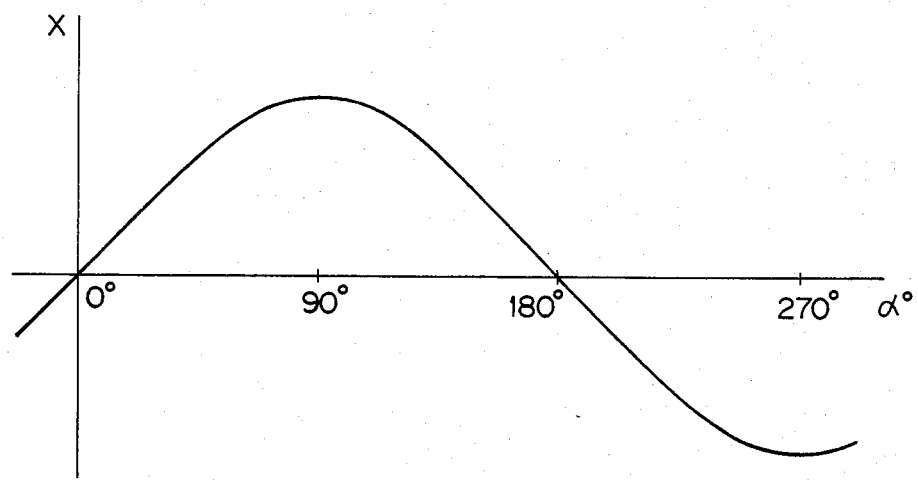
FIG. 6 is a graph showing the displacement of a tie rod for steering rear wheels, in the transverse direction of the vehicle, for various rotating angles of a lever of the steering system of FIG. 4.

Referring now to FIG. 6, the axis of abscissa represents the displacement X and that of ordinate represents the angle $\alpha°$. From this graph, the displacement X for various angles $\alpha°$ will be understood. When $\alpha°$ is 90°, X will become a positive maximum value. Thereafter, as $\alpha°$ increases, X will decrease and, when $\alpha°$ is 180°, return to zero. When $\alpha°$ is 270°, X will have a negative maximum value and, after $\alpha°$ has exceeded 270°, X will again turn to the positive side. The amount of X, that is, the steered angle of the rear wheels 104, 104, is allowed to be selectively determined by properly setting respective values of r, l and L. As a result, a desirable ratio of the steered angle of the rear wheels to the steered angle of the front wheels is obtainable. Moreover, in the gear box 113 or any other suitable place, there may be provided a speed changing mechanism to determine ratios of respective rotation angles of the lever 116 and the link 118 relative to the steering angle of the steering wheel 111. The rear wheels 104, 104 will thus be permitted to be steered in the same direction as the front wheels 101, 101 for relatively small steering angles of the steering wheel 111 and in the opposite direction with respect to that of the front wheels 101, 101 for relatively large steering angles of the steering wheel 111, or to be returned to a steered angle of zero or near zero for relatively large steering angles of the steering wheel 111 while for relatively small steering angles thereof the rear wheels 104, 104 will still be steered in the same direction as the front wheels 101, 101. The function of causing the rear wheels 104, 104 to be steered relative to the front wheels 101, 101 will be effected in both left and right steering directions of the steering wheel 111.

Although there have been described what are considered to be the preferred embodiments of the invention, it will be understood that the present invention may be embodied in other specific forms without departing from the spirit or essential characteristics thereof. The present embodiments as therefore to be considered in all respects as illustrative, and not restrictive. The scope of the invention is indicated by the appended claims rather than by the foregoing description.

We claim:

1. A steering system for a vehicle including steerable front and rear wheels, comprising:
   a steering wheel;
   a front wheel steering mechanism operatively cooperating with said steering wheel so as to steer said front wheels in accordance with a rotating movement of said steering wheels;
   a movement transmission mechanism operatively cooperating with said steering wheel so as to convert said rotating movement of said steering wheel into, and rearwardly transmit, a push-pull movement and output same in the form of a transverse movement;
   a rear wheel steering mechanism operatively cooperating with said movement transmission mechanism so as to steer said rear wheels in accordance with said transverse movement;
   said movement transmission mechanism comprising a first converting mechanism for converting said rotating movement of said steering wheel into said push-pull movement, rearward transmission means for rearwardly transmitting said push-pull movement and a second converting mechanism for converting said push-pull movement into said transverse movement;
   said first converting mechanism comprising a substantially vertically extending shaft interlocked to be rotatable with said steering wheel, and a lever member having a proximal end connected to said shaft and a distal end operatively connected to said rearward transmission means, said lever member being rotatable in a substantially horizontal plane;
   said second converting mechanism comprising a link member having a front end operatively connected to said rearward transmission means, and a substantially vertically extending support shaft disposed between said rear wheels and supporting a central part of said link member such that said link member turns in a substantially horizontal plane about said support shaft; and
   said rear wheel steering mechanism comprises a pair of rear tie rods having inner ends thereof connected to a rear end of said link member, respectively.

2. A steering system according to claim 1, wherein:
said rearward transmission means comprises an at least partially flexible member stretched in the form of a loop.

3. A steering system according to claim 1, wherein:
said rearward transmission means comprises a rod member extending substantially in the longitudinal direction of said vehicle.

4. A steering system according to claim 2, wherein:
said rearward transmission means further comprises at least one guide member secured to a vehicular body of said vehicle; and
said flexible member is guided by said guide member.

5. A steering system according to claim 4, wherein:
said guide member comprises a guide tube.

6. A steering system according to claim 4, wherein:
said guide member comprises a guide pulley.

7. A steering system according to claim 2, wherein:
said first converting mechanism further comprises a connection link interposed between the distal end of said lever member and said flexible member.

8. A steering system according to claim 2, wherein:
said second converting mechanism further comprises a connection link connected at one end thereof with said flexible member and at the other end thereof with said front end of said link member.

9. A steering system according to claim 3, wherein:
said lever member is connected at the distal end thereof to the front end of said rod member.

10. A steering system according to claim 2, wherein:
said link member of said second converting mechanism is substantially L-shaped; and
said link member is connected at said front end thereof with the rear end of said rod member.

11. A steering system according to claim 7, wherein:
said front wheel steering mechanism includes a steering shaft having said steering wheel secured at the upper end thereof; and
said lever member is secured at the base end thereof to the lower end of said steering shaft.

12. A steering system according to claim 9, wherein:
said front wheel steering mechanism includes a steering shaft having said steering wheel secured at the upper end thereof; and
said lever member is secured at the base end thereof to the lower end of said steering shaft.

* * * * *